United States Patent
Chen

(10) Patent No.: US 9,800,113 B2
(45) Date of Patent: Oct. 24, 2017

(54) MODULARIZED SERVO CASE

(71) Applicant: TRICORE CORPORATION, Huatan Township, Changhua County (TW)

(72) Inventor: Yen-Fu Chen, Huatan Township, Changhua County (TW)

(73) Assignee: Tricore Corporation, Huatan Township, Changhua County (TW)

( * ) Notice: Subject to any disclaimer, the term of this patent is extended or adjusted under 35 U.S.C. 154(b) by 295 days.

(21) Appl. No.: 14/528,320

(22) Filed: Oct. 30, 2014

(65) Prior Publication Data

US 2016/0126801 A1    May 5, 2016

(51) Int. Cl.
   H02K 5/22     (2006.01)
   H02K 11/00    (2016.01)
   H02K 5/04     (2006.01)
   H02K 11/21    (2016.01)
   H02K 11/33    (2016.01)

(52) U.S. Cl.
   CPC .............. *H02K 5/04* (2013.01); *H02K 11/21* (2016.01); *H02K 11/33* (2016.01); *H02K 5/225* (2013.01); *H02K 2211/03* (2013.01); *H02K 2213/12* (2013.01)

(58) Field of Classification Search
   CPC  H02K 5/04; H02K 5/22; H02K 5/225; H02K 11/00; H02K 11/21; H02K 11/33; H02K 2211/03; H02K 2213/12
   USPC ..................................... 310/68 R, 71, 89, 91
   IPC ............................................... H02K 5/22,11/00
   See application file for complete search history.

(56) References Cited

U.S. PATENT DOCUMENTS

| 5,528,093 | A | * | 6/1996 | Adam | H02K 5/225 310/239 |
| 6,201,326 | B1 | * | 3/2001 | Klappenbach | H02K 5/148 310/239 |
| 2002/0140304 | A1 | * | 10/2002 | Dreher | H02K 17/30 310/89 |
| 2003/0117028 | A1 | * | 6/2003 | Agnes | H02K 1/185 310/68 R |
| 2011/0187215 | A1 | * | 8/2011 | Sahara | H02K 23/04 310/89 |
| 2016/0126801 | A1 | * | 5/2016 | Chen | H02K 5/04 310/71 |

* cited by examiner

Primary Examiner — John K Kim
(74) Attorney, Agent, or Firm — Muncy, Geissler, Olds & Lowe, P.C.

(57) ABSTRACT

A modularized servo case includes a hollow first barrel and a hollow second barrel, each of which has a lower opening at a bottom end thereof. The first barrel and the second barrel have a first connecting portion and a second connecting portion disposed on outer surfaces thereof, respectively. The first and second barrels can be combined together by engagement between the first connecting portion and the second connecting portion. In this way, the different inner components required for the first and second barrels can be separately installed beforehand by modularization, and then the first and second barrels can be assembled. Therefore, the assembly is preferably convenient and the inner components can be assembled simultaneously, thus enhancing the whole production capacity and efficiency and facilitating the disassembly procedure in the later repair and maintenance operation.

4 Claims, 5 Drawing Sheets

US 9,800,113 B2

MODULARIZED SERVO CASE

BACKGROUND

1. Technical Field

The present disclosure relates to electrical machinery as classified to H02K of international patent classification (IPC), and more particularly to a modularized servo case.

2. Description of Related Art

A servo frequently served as a power source for providing specific functions for a variety of automatization apparatuses, mainly applied to a part requiring precise-angle positioning control. Therefore, the servo is not only widely applied to remote-control model products but one of important components in robot industry.

The traditional servo usually includes a motor, a power output shaft, and a reduction gear set. The reduction gear set can be driven by the motor to rotate the power output shaft. However, the traditional servo case just has a limited inner space. In order to more effectively make good use of the space within the case, enabling the servo to contain a larger rotor or stator within the same volume thereof, some servos are equipped with motors having no housings to improve the output power thereof.

However, unlike the motor having its housing, the motor having no housing and other components are assembled together while the servo is assembled and are not assembled integrally in advance, so the whole assembly operation of the servo becomes more complicated. Therefore, it not only decreases the production capacity but makes the disassembly of the servo more difficult in later repair and maintenance operation.

SUMMARY OF THE INVENTION

The primary objective of the present disclosure provides a servo which can enhance the convenience of assembly and disassembly thereof.

To attain the foregoing objective, the present disclosure provides a modularized servo case having a first barrel and a second barrel, each of which is hollow and has at least one opening. The first barrel has at least one first connecting portion disposed at an outer surface thereof. The second barrel has at least one second connecting portion disposed at an outer surface thereof to detachably engage the at least one first connecting portion.

The present disclosure further provides a servo formed of the modularized servo case, a lower cover, a motor, and a circuit board. The lower cover covers respective bottom ends of the first barrel and the second barrel. The motor is disposed inside the second barrel and has a plurality of terminals extending out of an opening of the second barrel. The circuit board is disposed among the first barrel, the second barrel, and lower cover and has an electrical connection structural component for electric connection with the terminals.

In light of the aforesaid structures, inner components of the servo can be assembled in the first barrel or the second barrel first, and the first barrel and the second barrel are then assembled integrally by the connecting portions. Therefore, the assembly of the servo is more convenient, and the components within each of the first barrel and the second barrel can be assembled simultaneously, enhancing the whole assembly efficiency and production capacity and facilitating the disassembly in the process of later repair and maintenance operation.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
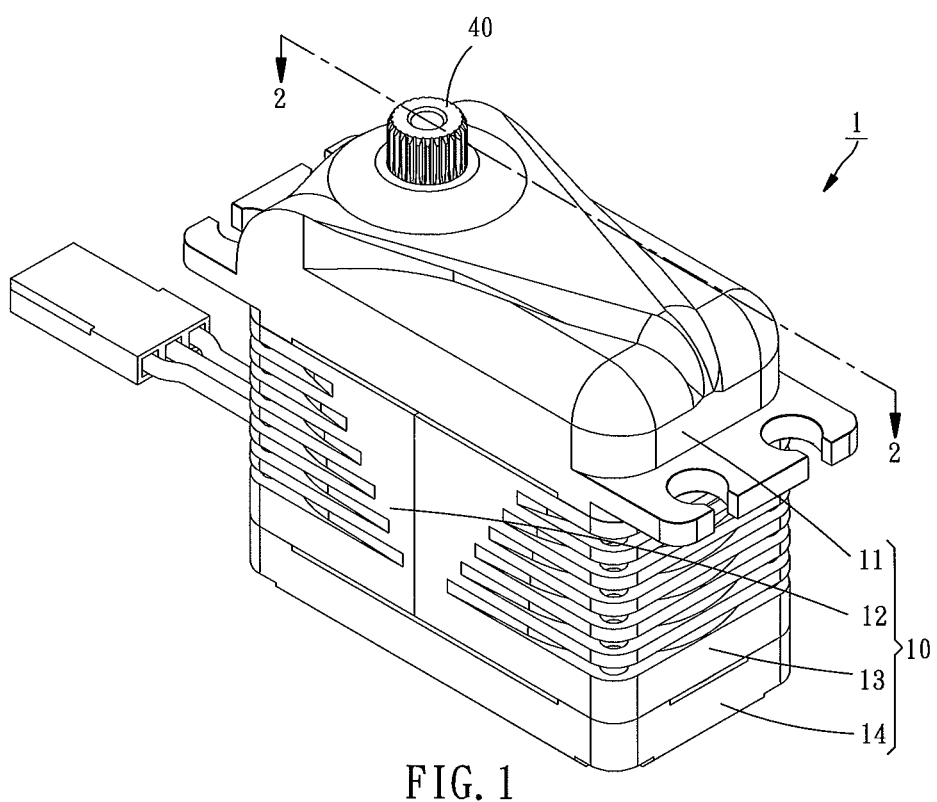
FIG. 1 is a perspective view of a servo of a preferred embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same parts or the like.

The present disclosure provides a preferred embodiment cooperating with drawings for illustration. Please refer to FIGS. 1-4. For explanatory convenience, the power output shaft 40 of the servo 1 is protruded upwardly as the directional basis.

Figure 2:
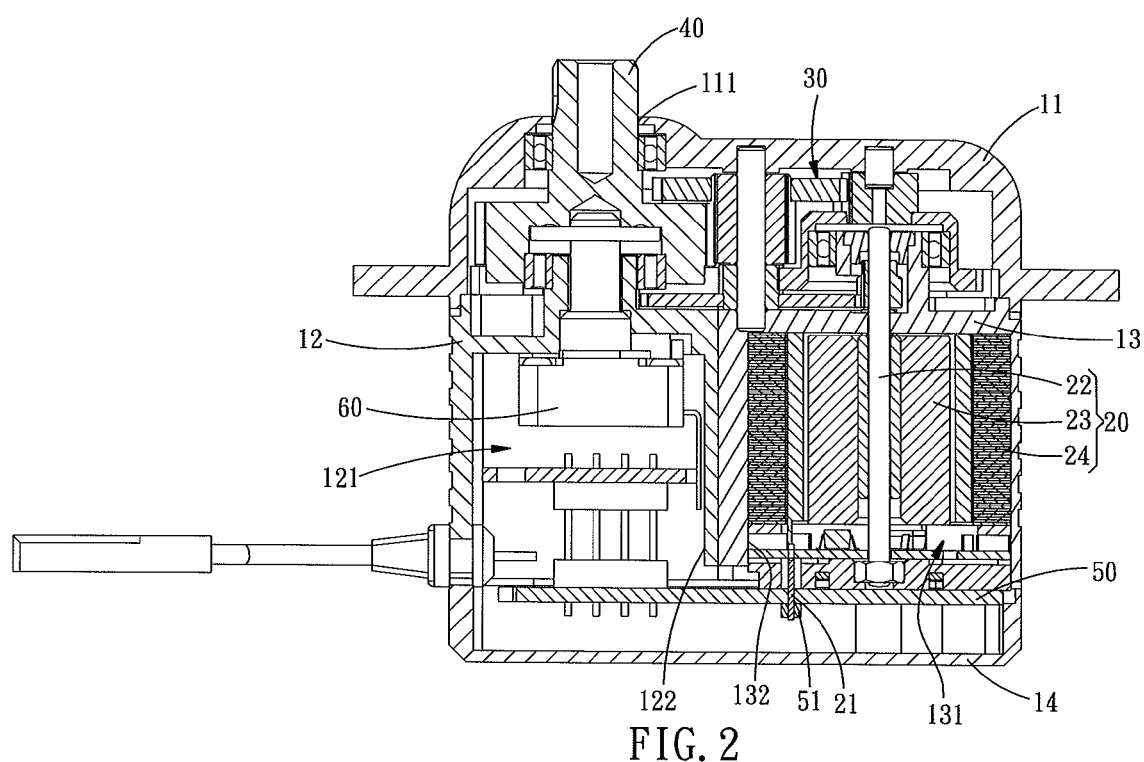
FIG. 2 is a sectional view taken along a line 2-2 indicated in FIG. 1.

Referring to FIGS. 1 and 2, a case 10 of a servo 1 includes an upper cover 11, a lower cover 14, a first barrel 12, and a second barrel 13. The first and second barrels 12 and 13 are connected between the upper cover 11 and the lower cover 14. The upper cover 11 has a through hole 111 for a power output shaft 40 of the servo 1 to be inserted through. A circuit board is disposed among the lower cover 14, the first barrel 12, and the second barrel 13 for providing electric power for components inside the servo 1. A gear set 30 is disposed among the upper cover 11, the first barrel 12, and the second barrel 13 and can be driven to rotate the power output shaft 40 by a motor 20 mounted inside the second barrel 13, wherein the motor 20 is a motor without any housing. Operations of the motor 20, the gear set 30, and the power output shaft 40 are not the key features of the present disclosure, so the detailed description is omitted.

Figure 3:
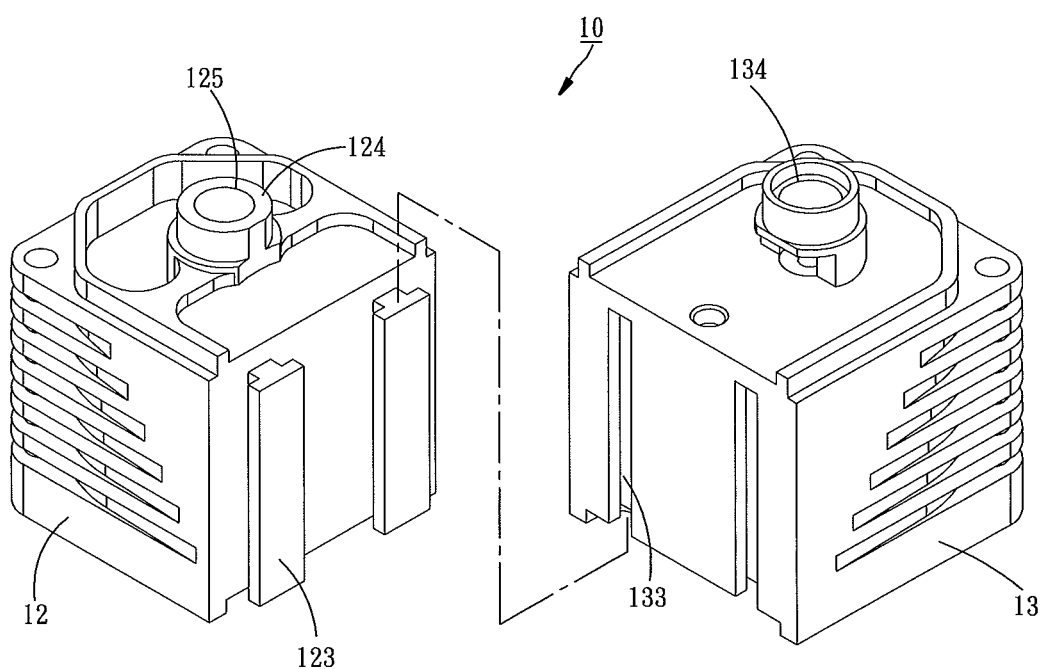
FIG. 3 is a partially exploded view of a servo case of the preferred embodiment of the present disclosure.

Referring to FIG. 2 and FIG. 3, the first barrel 12 and the second barrel 13 are hollow and have an assembly chamber 121(131) and a lower opening 122(132) disposed at a bottom end thereof communicating with the assembly chamber 121(131) separately, whereby an angle detector 60 of the servo 1 and the motor 20 can be mounted in the assembly chambers 121, 131 of the first barrel 12 and the second barrel 13 respectively. The first barrel 12 and the second barrel 13 have outer surfaces facing each other, respectively, and a first connecting portion 123 and a second connecting portion 133 disposed on the outer surfaces, respectively. In this preferred embodiment, the first connecting portion 123 includes two sliders disposed parallel to each other. Each of the two sliders is T-shaped in sectional view for structural firmness, extending between a top end of the first barrel 12 and a bottom end of the first barrel 12. The second connecting portion 133 includes two slide rails recessed from the outer surface of the second barrel 13 and spaced from each other to correspond to the two sliders. The two slide rails are also T-shaped in sectional view. In this way, the first barrel 12 and the second barrel 13 can be combined together as the two slide rails engage the two sliders, respectively.

In addition, the first barrel 12 has a mounting base 124 disposed on the top end thereof for mounting the power output shaft 40. The power output shaft 40 is connected to the angle detector 60 disposed inside the first barrel 12 via the through hole 125 located at the center of the mounting base 124 for detecting a rotational angle of the power output shaft 40. The second barrel 13 has an upper opening 134 formed at a top end thereof. The upper opening 134, the assembly chamber 131, and the lower opening 132 communicate with one another. In this exemplary embodiment, the motor 20 is mounted in the second barrel 13, so a rotary shaft 22 of the motor 20 can be connected to the gear set 30 via the upper opening 134. The mounting base 124 is provided for conveniently mounting the power output shaft 40, so it is not any necessary component.

The first barrel 12 and the second barrel 13 are combined together by the engagement between the first connecting portion 123 and the second connecting portion 133, so different parts of the servo 1 can be assembled in different production lines in advance, respectively. For example, the angle detector 60 can be assembled to the first barrel 12 in a production line in advance and meanwhile, components of the motor 20, such as a rotor 23 and a stator 24, can be installed in the second barrel 13 in another production line, and finally the first barrel 12 and the second barrel 13 are combined together. The assembly procedures of the different parts inside the servo 1 can be performed separately, so the assembly convenience, the whole assembly efficiency, and the production capacity can be enhanced.

In addition, when the servo 1 needs to repaired, the case 10 of the servo 1 of the present disclosure can be disassembled quickly from the servo 1, so it is convenient to repair the servo 1. Moreover, the motor 20 having a predetermined characteristic or power can be assembled in the second barrel 13 by modularization. If the user desires to replace the motor 20 with another as it depends, the present disclosure can do the quick replacement to further meet the user's requirement for customizing the servo 1.

Figure 4:
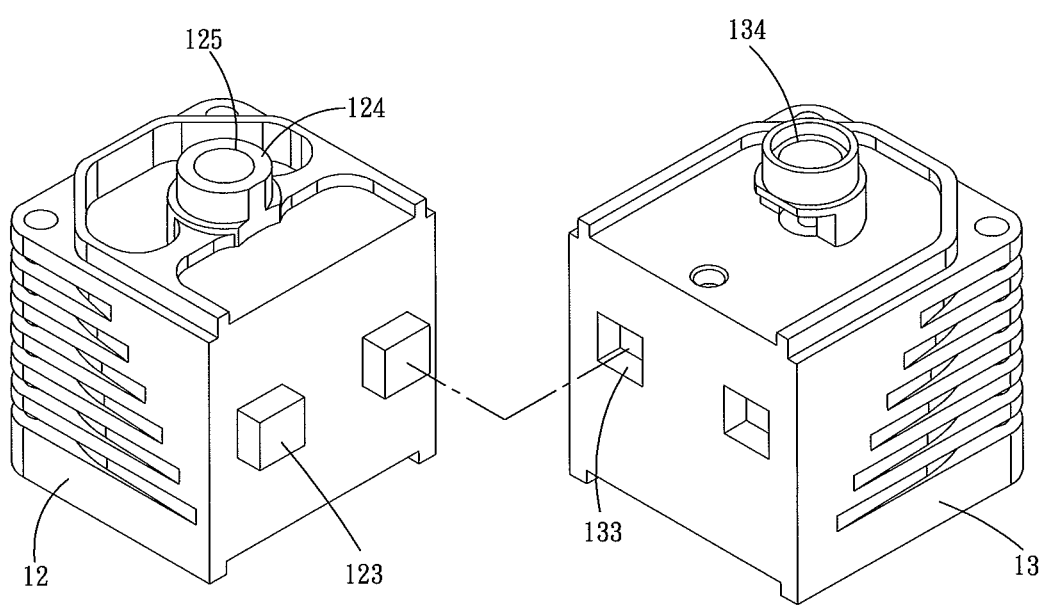
FIG. 4 is a partially exploded view of another pattern of the servo case of the preferred embodiment of the present disclosure.

It is worth mentioning that the first connecting portion 123 and the second connecting portion 133 of the present disclosure are not limited to those of the exemplary embodiment. For example, the first connecting portion 123 and the second connecting portion 133 can alternatively be formed of two connecting blocks 123 and two connecting cavities 133, respectively, as shown in FIG. 4, so long as the first barrel 12 and the second barrel 13 can be conveniently assembled together by the engagement between the first connecting portion 123 and the second connecting portion 133.

Figure 5:
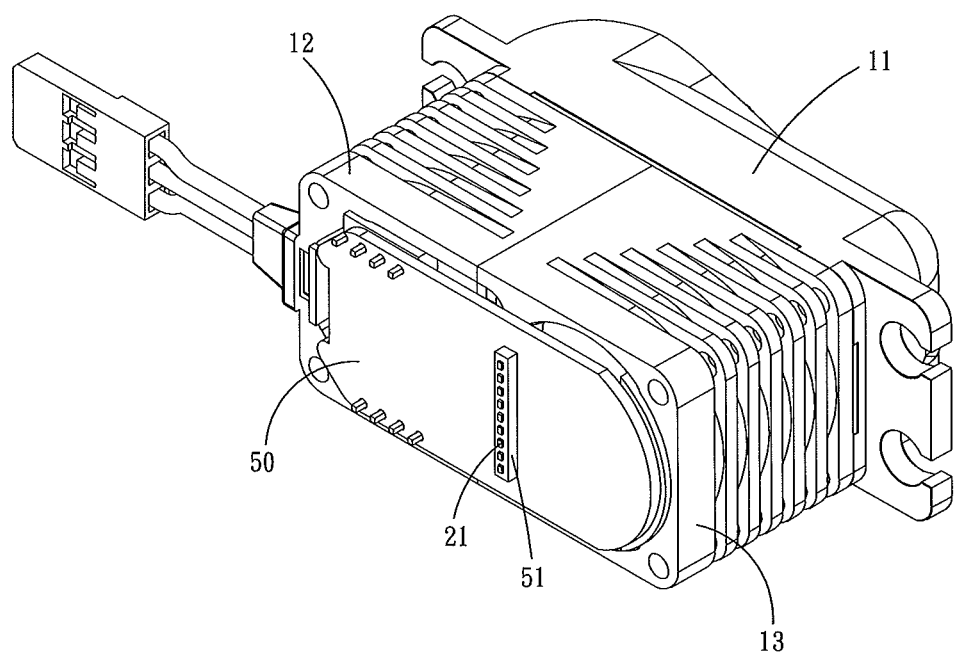
FIG. 5 is a perspective view of the servo without a lower cover at another angle.

In order to make the disassembly of the servo 1 more convenient, a plurality of male terminals 21 of the motor 20 protrude from the lower opening 132 and an electrical connection structural component 51 (e.g. a terminal holder having a plurality of female terminals or jacks) is disposed on the circuit board 50, so the electrical connection structural component 51 of the circuit board 50 can be corresponsively connected electrically with the male terminals 21 while the circuit board 50 is assembled between the lower cover 14, the first barrel 12, and the second barrel 13, as shown in FIG. 5, so the effects of quick disassembly and quick assembly can be achieved.

It should be noted that the male terminals 21 of the motor 20 and the electrical connection structural component 51 of the circuit board 50 can be exchanged with each other.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A servo, comprising:
   a case, having a hollow first barrel and a hollow second barrel, the first barrel having a first upper opening, a first bottom opening and at least one first connecting portion disposed at an outer surface of the first barrel, the second barrel having a second upper opening, a second bottom opening and at least one second connecting portion disposed at an outer surface of the second barrel, the at least one second connecting portion being detachably engaged with the at least one first connecting portion;
   a lower cover covering the first bottom opening and the second bottom opening;
   a motor disposed inside the second barrel and having a plurality of terminals, which downwardly extends out of the second bottom opening of the second barrel; and
   a circuit board disposed among the first barrel, the second barrel, and the lower cover, the circuit board having an electrical connection structural component for upward electric connection with the terminals,
   wherein the at least one first connecting portion is at least one slide rail and the at least one first connecting portion is at least one slider; the at least one first connecting portion extends between a top end and a bottom end of the first barrel; the at least one second connecting portion extends between a top end and a bottom end of the second barrel.

2. The servo as defined in claim 1, wherein the electrical connection structural component is a terminal holder.

3. A servo, comprising:
   a case, having a hollow first barrel and a hollow second barrel, the first barrel having a first upper opening and at least one first connecting portion disposed at an outer surface of the first barrel, the second barrel having a second upper opening and at least one second connecting portion disposed at an outer surface of the second barrel, the at least one second connecting portion being detachably engaged with the at least one first connecting portion;
   an upper cover covering the first upper opening and the second upper opening and having a through hole disposed at a top of the upper cover;
   a motor disposed inside the second barrel and having a rotary shaft, which upwardly extends out of the second upper opening of the second barrel;
   a gear set disposed among the upper cover, the first barrel and the second barrel, the gear set being connected with the rotary shaft of the motor;
   a power output shaft upwardly protruded through the through hole and connected with the gear set;
   an angle detector disposed inside the first barrel and connected with the power output shaft for detecting a rotational angle of the power output shaft,
   wherein the at least one first connecting portion is at least one slide rail and the at least one first connecting portion is at least one slider; the at least one first connecting portion extends between a top end and a bottom end of the first barrel; the at least one second connecting portion extends between a top end and a bottom end of the second barrel.

4. A servo, comprising:

a case, having a hollow first barrel and a hollow second barrel, the first barrel having a first upper opening and at least one first connecting portion disposed at an outer surface of the first barrel, the second barrel having a second upper opening and at least one second connecting portion disposed at an outer surface of the second barrel, the at least one second connecting portion being detachably engaged with the at least one first connecting portion;

an upper cover covering the first upper opening and the second upper opening and having a through hole disposed at a top of the upper cover;

a motor disposed inside the second barrel and having a rotary shaft, which upwardly extends out of the second upper opening of the second barrel;

a gear set disposed among the upper cover, the first barrel and the second barrel, the gear set being connected with the rotary shaft of the motor;

a power output shaft upwardly protruded through the through hole and connected with the gear set;

an angle detector disposed inside the first barrel and connected with the power output shaft for detecting a rotational angle of the power output shaft, wherein the first barrel and the second barrel further comprise a first bottom opening and a second bottom opening respectively; the servo further comprises a lower cover and a circuit board; the lower cover covers the first bottom opening and the second bottom opening; the motor further comprises a plurality of terminals, which downwardly extend out of the second bottom opening of the second barrel; the circuit board is disposed among the first barrel, the second barrel, and the lower cover; the circuit board comprises an electrical connection structural component for upward electric connection with the terminals.

* * * * *